US008458228B2

(12) United States Patent
Ben-Haim et al.

(10) Patent No.: US 8,458,228 B2
(45) Date of Patent: Jun. 4, 2013

(54) OCCURRENCE MANAGEMENT IN PRODUCT DATA MANAGEMENT SYSTEMS

(75) Inventors: Ori Ben-Haim, Huntington Beach, CA (US); Frances Elizabeth Evans, Seattle, WA (US); Eric M. Leeson, Mason, OH (US); Daniel Jonathan Archer, Lower Cambourne (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 0 days.

(21) Appl. No.: 13/241,467

(22) Filed: Sep. 23, 2011

(65) Prior Publication Data

US 2013/0080478 A1 Mar. 28, 2013

(51) Int. Cl.
*G06F 17/30* (2006.01)
(52) U.S. Cl.
USPC .......................................... 707/806; 707/802
(58) Field of Classification Search
None
See application file for complete search history.

(56) References Cited

U.S. PATENT DOCUMENTS

| | | | |
|---|---|---|---|
| 5,307,261 A | 4/1994 | Maki et al. | |
| 5,311,424 A | 5/1994 | Mukherjee et al. | |
| 5,434,791 A | 7/1995 | Koko et al. | |
| 5,717,902 A | 2/1998 | D'Souza et al. | |
| 5,873,075 A | 2/1999 | Cochrane et al. | |
| 6,101,507 A | 8/2000 | Cane et al. | |
| 6,397,125 B1 | 5/2002 | Goldring et al. | |
| 6,801,822 B1 * | 10/2004 | Fujiwara et al. | 700/108 |
| 7,085,776 B2 * | 8/2006 | Callahan | 1/1 |
| 7,096,465 B1 | 8/2006 | Dardinski et al. | |
| 7,136,843 B2 | 11/2006 | Bigus et al. | |
| 7,299,202 B2 | 11/2007 | Swanson | |
| 7,343,364 B2 | 3/2008 | Bram et al. | |
| 7,493,344 B2 | 2/2009 | Wald et al. | |
| 7,526,468 B2 | 4/2009 | Vincent et al. | |
| 7,680,818 B1 | 3/2010 | Fan et al. | |
| 7,685,183 B2 | 3/2010 | Pace et al. | |
| 2002/0165724 A1 | 11/2002 | Blankesteijn | |
| 2003/0120902 A1 | 6/2003 | Kottapalli et al. | |
| 2003/0204527 A1 * | 10/2003 | Callahan | 707/104.1 |
| 2003/0212681 A1 | 11/2003 | Kasper, II | |
| 2004/0162741 A1 * | 8/2004 | Flaxer et al. | 705/7 |
| 2004/0250258 A1 | 12/2004 | Raghuvir et al. | |
| 2005/0125311 A1 | 6/2005 | Chidiac et al. | |
| 2006/0143227 A1 | 6/2006 | Helm et al. | |
| 2006/0161894 A1 | 7/2006 | Oustiougov et al. | |
| 2007/0033204 A1 | 2/2007 | Callahan | |
| 2007/0239502 A1 * | 10/2007 | Babu | 705/7 |

(Continued)

OTHER PUBLICATIONS

Teamcenter Express Collaborative Product Data Management (cPDM), Self-Paced Training, SP15330-Version 5.0, Aug. 2009.*

(Continued)

*Primary Examiner* — Hung Le (57) ABSTRACT

Methods for product data management and corresponding systems and computer-readable mediums. A method includes maintaining a data structure for a complex item. The data structure includes a root node representing the complex item, at least one assembly node associated with the root node, and a plurality of part nodes each associated with the assembly node. The method includes defining at least two absolute occurrences associated with the root node and corresponding to at least the root node and the assembly node. The method includes defining at least one managed occurrence that includes a plurality of the absolute occurrences. The method includes using the managed occurrence as a central control authority for the plurality of absolute occurrences.

20 Claims, 5 Drawing Sheets

U.S. PATENT DOCUMENTS

| | | | |
|---|---|---|---|
| 2008/0027781 A1 | 1/2008 | vom Scheidt et al. | |
| 2009/0132996 A1 | 5/2009 | Eldridge et al. | |
| 2010/0223593 A1 | 9/2010 | Eldridge et al. | |
| 2010/0274759 A1 | 10/2010 | Takeuchi et al. | |
| 2010/0274818 A1* | 10/2010 | Chauvin et al. | 707/803 |
| 2011/0167037 A1 | 7/2011 | Kaiser | |
| 2011/0178998 A1 | 7/2011 | Nizami et al. | |
| 2011/0179059 A1 | 7/2011 | Kaiser | |
| 2011/0251975 A1* | 10/2011 | Evans et al. | 705/348 |

OTHER PUBLICATIONS

.NET Programmer's Guide Solid Edge with Synchronous Technology API, Solid Edge-Siemens PLM Software, Sep. 2010.*

Denno et al., "Requirements on Information Technology for Product Lifecycle Management", 2004, 16 pages.

IBM Prodcution Development Integration Framework, "The foundation for industry-wide integration to manage the product lifecycle", IBM PLM Solutions, May 2009, 12 pages.

Product Data Management and Software Configuration Management—Similarities and Differences Special Edtion for the Conference Assoc of Swedish Engineering Ind Sep. 27, 2001 181 pgs.

Written Opinion of the International Searching Authority dated Mar. 14, 2013 corresponding to International Application No. PCT/US2012/56287 filed Sep. 20, 2012 (3 pages).

PCT International Search Report mailed Mar. 14, 2013 corresponding to PCT International Application No. PCT/US2012/56287 filed Sep. 20, 2012 (3 pages).

* cited by examiner

OCCURRENCE MANAGEMENT IN PRODUCT DATA MANAGEMENT SYSTEMS

CROSS-REFERENCE TO OTHER APPLICATION

This application shares some subject matter with commonly-assigned, concurrently filed U.S. patent application Ser. No. 13/241,403 for "Data Structure Partitioning in Product Data Management Systems", which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for product data management and corresponding systems and computer-readable mediums, A method includes maintaining a data structure for a complex item. The data structure includes a root node representing the complex item, at least one assembly node associated with the root ode, and a plurality of part nodes each associated with the assembly node. The method includes defining at least two absolute occurrences associated with the root node and corresponding to at least the root node and the assembly node. The method includes defining at least one managed occurrence that includes a plurality of the absolute occurrences. The method includes using the managed occurrence as a central control authority for the plurality of absolute occurrences.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

It is a valuable and typical practice to model products, factories and other complex entities composed of many constituents into a hierarchical structure of reusable elements. Examples of reusable elements include parts and assemblies, logical systems, fasteners, welds and factory cells. A single element can be instantiated many different times in a structure. Each instantiation represents a different usage of the same identically defined element and is referred to as an "occurrence" of that element. For example a car may have four identical wheels. There is a single definition of the wheel, but it is instantiated four times in the product structure of that car. There are therefore four wheel occurrences in the car corresponding to the front left, front right, rear left and rear right wheels.

The ability to model each occurrence explicitly and associate unique data to it while retaining the cohesiveness of the common definition element has been one of the key innovations in product structure management in recent years. The powerful features supported by an occurrence based model include the ability to define and scope specific information about the usage of an element to the exact context it applies and to work within nested contexts that override data from lower level to higher level contexts.

Occurrences, by their definition, always exist in some context. For example, a front left wheel belongs to the car context, whereas a left wheel might belong to an axle assembly context. Data associated to an occurrence is contextual and effectively "belongs" to the context. An occurrence, as used herein, represents a path through such a product data model of an assembly to a specific node in its proper context, including all parent nodes.

Various disclosed embodiments allow concurrent collaboration between many engineers working on the same complex product while supporting re-use of common product definition information. For example, an engineering part can have a part number, geometry, specification of its form, fit and function and significant other descriptive information. This part can be re-used many times in one product and/or in many products. By using the managed occurrences described herein, systems and users can re-use all the common definition information while allowing each usage to have usage-specific information. Disclosed embodiments allow this usage-specific information to be authored in parallel for each usage, and also allow each usage to have independent versioning, workflow, change management, etc.

Figure 1:
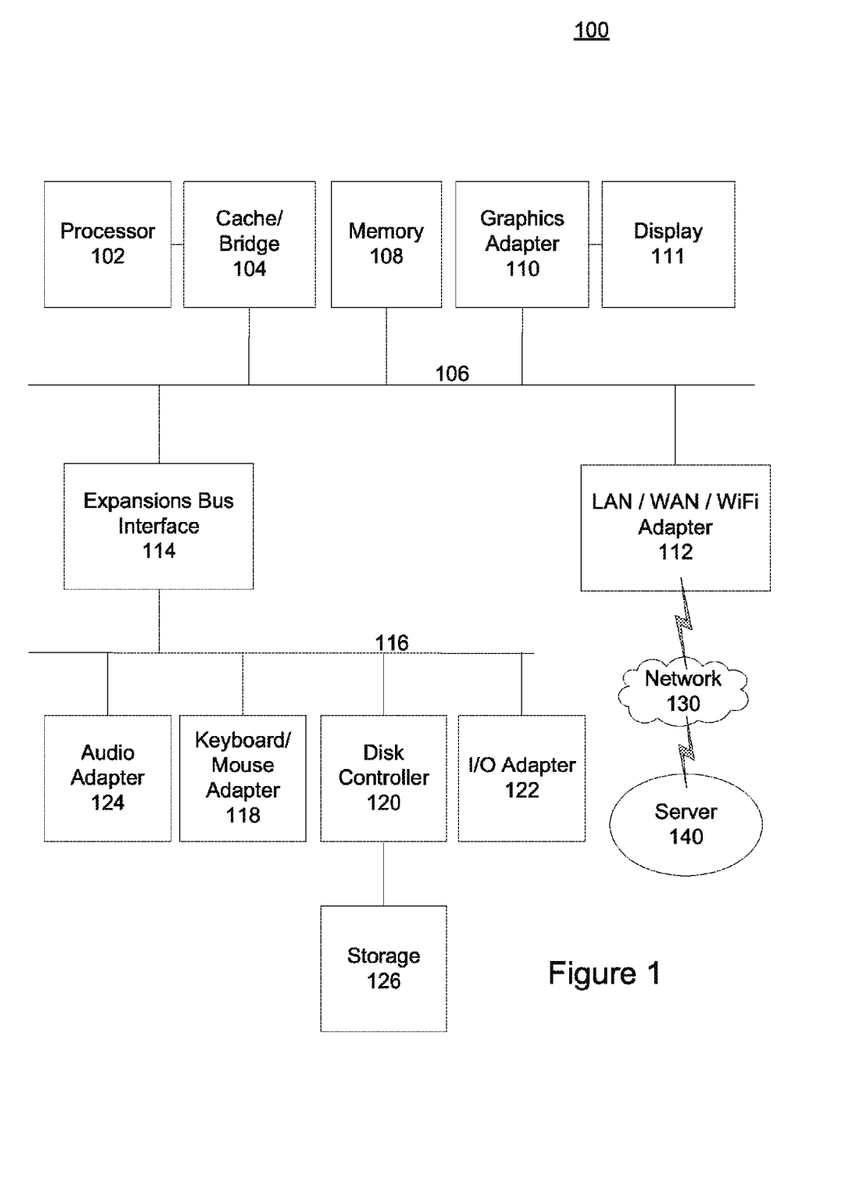
FIG. 1 depicts a block diagram of a data processing system in which an embodiment can be implemented.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Conventional occurrence-based modeling has limitations. For example, in the existing systems, all occurrences in a given context are owned and managed as a group belonging to the top level context. However, in an occurrence world, the number of occurrences belonging a given context can get extremely large (potentially millions for certain complex product structures) and it quickly becomes impractical to manage as a single group.

This causes a number of problems. For example, in conventional systems, granularity of changes is very coarse and it is not possible to track, record or control changes to specific occurrences. Further, it is not possible for two individuals to be working on two occurrences in parallel. Since the whole group is controlled as a unit, that group is checked out to one person at a time Any change to one occurrence of a group enforces the revision of the context object which requires copying the data of all occurrences into a new revision. This incurs a significant overhead in performance and data storage.

Also, the context for the occurrences and the control authority for making changes to those occurrences are assumed to be the same. This results in a user being required to "check out" a very large assembly in order to make changes to some small element of it. There is no ability to distinguish control of changes to a context object (e.g. a product) from changes to occurrences of elements in its context.

In other systems, an occurrence is not modeled as an independent entity that the user is entitled to interact with directly. Occurrence structure and data editing is accomplished "behind the scenes" via changes made within a particular context setting. Users have no ability to explicitly check out an individual occurrence, revise it, send it through a workflow, promote its status etc.

Disclosed embodiments enable users to successfully model large complex products (especially those with relatively flat structures). The systems and methods disclosed herein enable concurrent engineering, decreased cycles times for engineering changes and conformance to industry or government regulations. Changes to product lifecycle data is controllable and trackable at a suitable level of granularity to support a customer's data security and data integrity requirements. By overcoming the limitations of other systems, disclosed embodiments are fluster and more efficient, and bring greater value to the users.

Figure 2:
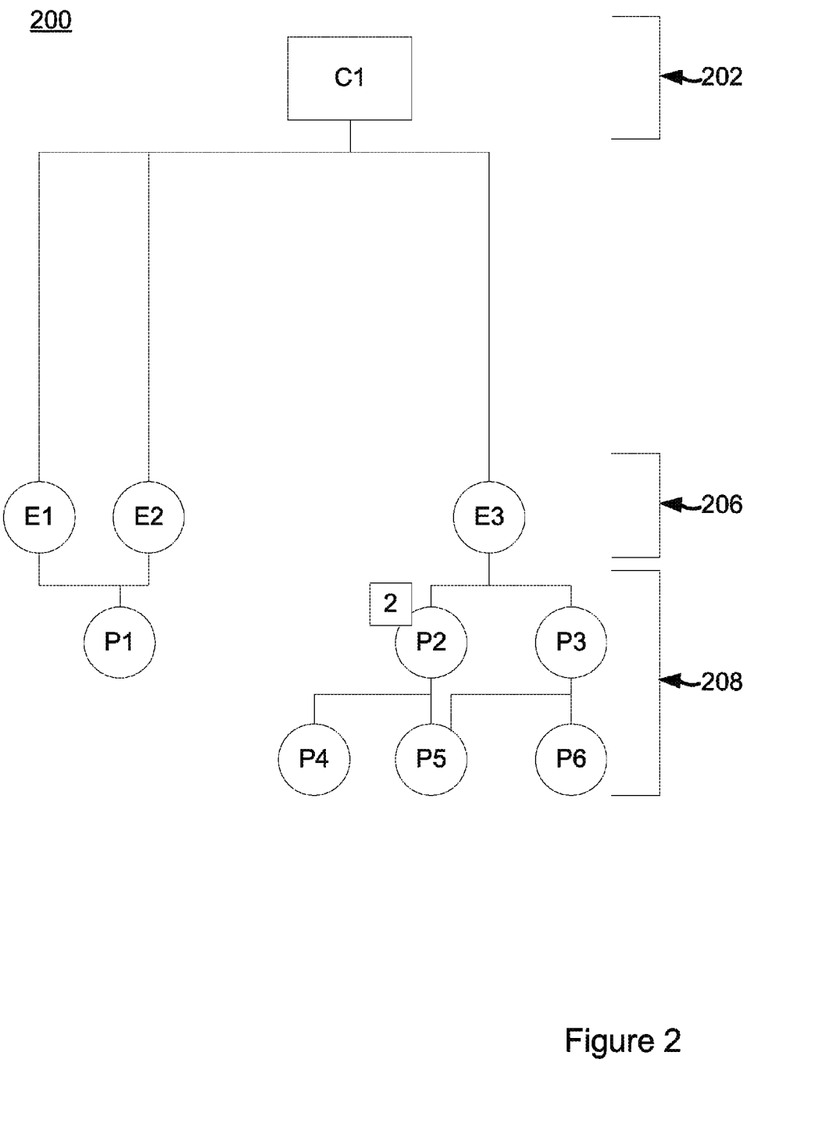
FIG. 2 depicts an example of a product structure as may be maintained in a PDM system.

FIG. 2 depicts an example of a product data structure 200 as may be maintained in a PDM system. In this example, the product structure 200 is represented as a hierarchical tree, using lines to show relationships between the nodes, with some nodes doubly-connected as being children of multiple parent nodes.

The top or root node 202 may indicate the overall context or product described by the structure 200, denoted as "C1".

The next level of nodes 206 can represent end items, such as assemblies, denoted as E1, E2, and E3. For example, in a vehicle, this could be a brake or axle assembly, a lighting system assembly, or otherwise.

The next level of nodes 208 can represent the sub-components of each of the corresponding assemblies, including parts or subassemblies, and are denoted as P1, P2, P3, P4, P5, and P6. Note the "2" at P2, which indicates that two identical P2 instances are present, each with children P4 and P5. The child nodes of P3 are P5 and P6.

Figure 3:
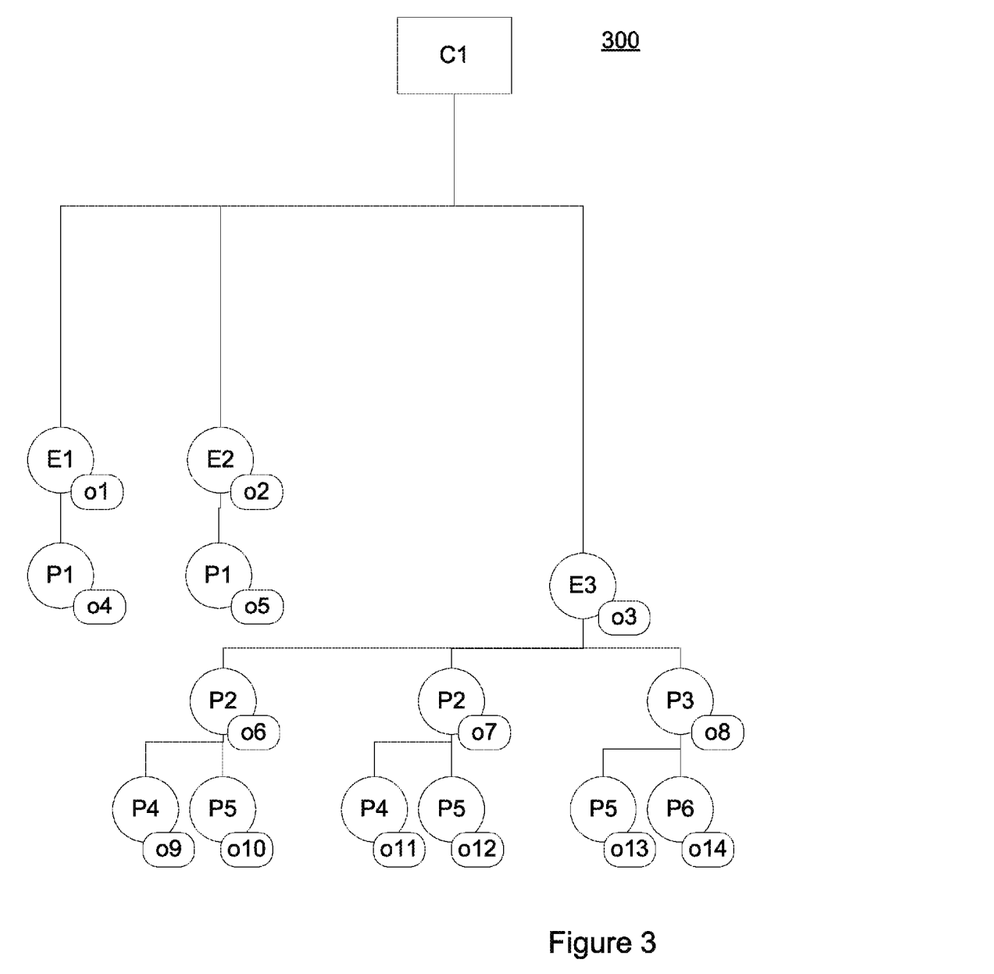
FIG. 3 illustrates occurrences in a product structure.

FIG. 3 illustrates occurrences in a product structure 300 that corresponds to product structure 200.

In this figure, each separate occurrence is labeled, denoted as o1-o14. Each occurrence is a unique "path" through the structure, and so various nodes are duplicated to show the different occurrences, including duplication of both P2 instances. Each occurrence in this figure is an "absolute" occurrence that specifically and uniquely identifies all of the included nodes in the path from the product context C1 to the specific occurrence node, Occurrence o10 defines the path C1-E3-P2-P5 and includes each context, end item, and part necessary to define that occurrence.

As described herein, absolute occurrences can be difficult to work with, since each of the occurrences is "owned" by its context. Editing, visualizing, or manipulating a single occurrence can require a user or system to take ownership of the entire context, preventing other users or systems from working with other occurrences in the context.

Various embodiments include a set of capabilities collectively referred to herein as "Managed Occurrences". Managed Occurrences, in various embodiments, decouple of the control authority for an occurrence from its owning context, and represent the occurrence as a first class object that can be independently manipulated without effecting access to other managed occurrences.

According to various embodiments, both of these areas features can be implemented using a "Managed Occurrence" object that is the control authority for changes to data on an occurrence in a given context. This inserts a critical level of indirection between the owning Context and the occurrence data. A Context owns the Managed Occurrence which owns the context specific data on an occurrence.

Decoupling of control authority for an occurrence from its owning context: The context in which an occurrence exists is decoupled from the control authority object that controls changes to its data. Instead, control authority is delegated by the system to the "Managed Occurrence" (MO).

Representation of an occurrence as a first class object: Occurrences are managed as first class objects in the systems that support standard data management and configuration management capabilities. Various embodiments use the Managed Occurrence object as the first class object with which a user interacts in order to make changes to occurrence data in a context. Further, typical PDM configuration management capabilities can be made available for use on the MO, including revisions, check-outs, workflows, etc. In some specific implementations, the Managed Occurrence object extends the construct of "Item" and therefore inherits its capabilities. Additional relationships and behavior are added to ensure that access to an MO corresponds precisely to having access to the data on the occurrence the MO controls in the context the MO exists in.

In some embodiments, multiple MOs can be used and maintained by the system for the same occurrence in the same context, e.g., separated by "discipline", in such cases, for example, there could be an Engineering MO and a Manufacturing MO scoping the data important to each of those disciplines to allow concurrency even of the same occurrence in the same context for different discipline-specific information.

Additionally, the management and manipulation of Managed Occurrences as first class objects supports greater flexibility at an application level. Using these techniques, disclosed embodiments allow users to work on occurrences in a context without requiring a full expansion of the structure between the context and the relevant occurrence.

Figure 4:
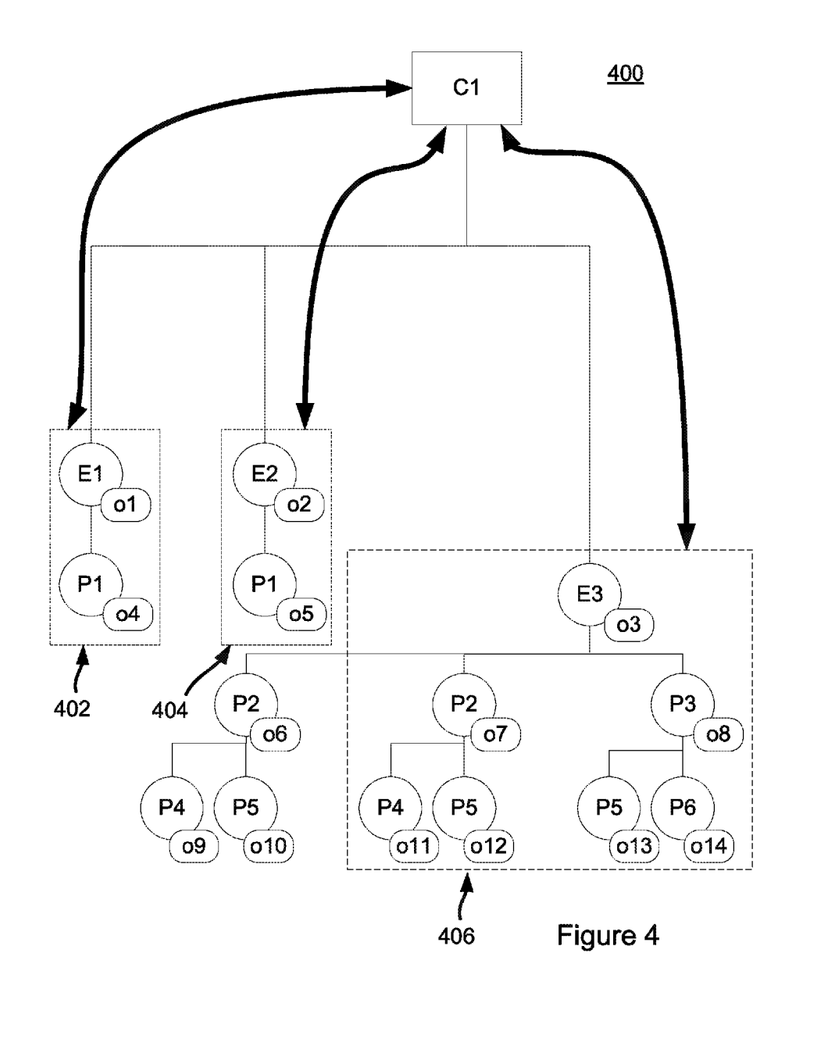
FIG. 4 illustrates Managed Occurrences in accordance with disclosed embodiments.

FIG. 4 illustrates Managed Occurrences in accordance with disclosed embodiments. For example, a Managed Occurrence can manage the occurrence data for a set of absolute occurrences, and acts as the central control authority, in place of the top-level context item, of the absolute occurrences of an item and its children in the product context.

This example shows MO 402, including absolute occurrences o1 and o4, MO 404, including absolute occurrences o2 and o5, and MO 406, including absolute occurrences o3, o7, o8, o11, o12, o13, and o14.

Each of these MOs acts as the central control authority for its included absolute occurrences. The dotted lines in this figure represent each ME and its "control authority zone."

Each MO allows the system to control "managed" behavior for its occurrences, and to treat occurrences like any other workspace object for access control, workflow, checkout, release, and other purposes. In certain embodiments, the Managed Occurrences will differ from other managed objects in the sense that the system and user are actually controlling and manipulating a group of occurrences.

While the MOs have control authority over their included absolute occurrences, the context C1 still has override control over each MO and its included occurrences as illustrated by the bold lines in this figure. Any partitions, as described in the patent application incorporated above, can be ignored for MO purposes.

Figure 5:
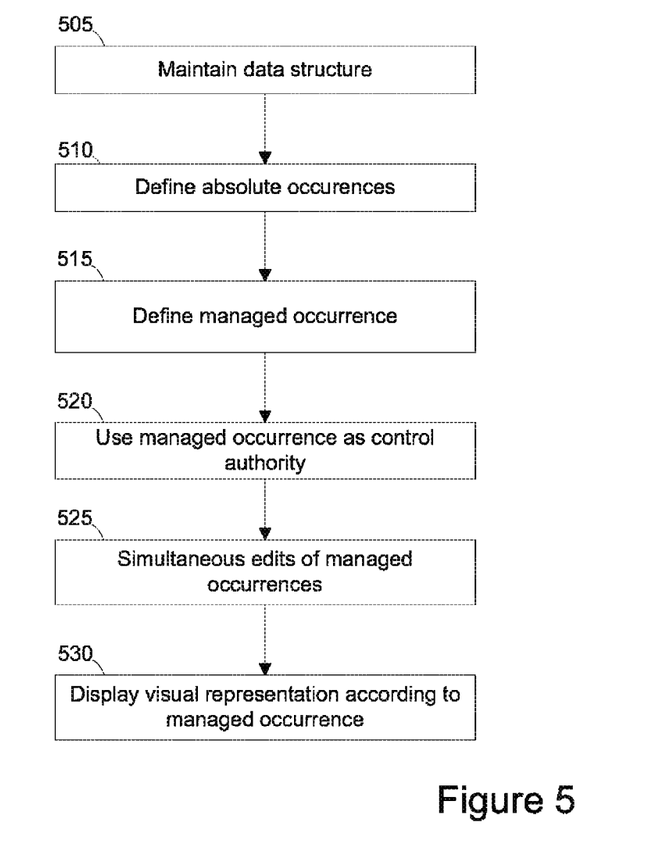
FIG. 5 depicts a flowchart of a process in accordance with disclosed embodiments.

FIG. 5 depicts a flowchart of a process in accordance with disclosed embodiments that may be performed, for example, by a PLM or PDM system.

The system maintains a data structure for a product or other complex item (step 505). This data structure is hierarchical in some embodiments, but the processes described herein can equally well be applied to a flat structure or effectively no structure at all if the elements of a product are grouped together in some way. In any of these structures, the techniques described herein can separate the usage-specific data from the general definition in such a way that the usage-specific data can be modified concurrently and with change control, access control, versioning etc.

The data structure in this example includes a root node representing a complex item, at least one assembly node associated with the root node, and a plurality of part nodes each associated with a respective one of the assembly node(s). The assembly node and the part node can represent assemblies and sub-assemblies, and the part node can represent an individual part of an assembly. The root node can be a context node.

The system defines at least two absolute occurrences associated with the root node and corresponding to at least a root node and an assembly node (step 510). One or more of the absolute occurrences can also be defined by a part node.

The system defines at least one managed occurrence including a plurality of absolute occurrences (step 515). The managed occurrence is owned by the root node.

The system uses the managed occurrence as a central control authority for the plurality of absolute occurrences (step 520). This can include the system controlling "managed" behavior for the plurality of occurrences using the managed occurrence, which can include access control, workflow, checkout, release, and other functions.

In cases where there are multiple managed occurrences associated with the data structure, the system can allow different managed occurrences, and their respective absolute occurrences, to be simultaneously manipulated by different users (step 525).

The system can also display a visual representation of a least a portion of the complex item to a user according to a selected managed occurrence (step 530).

Disclosed embodiments provide significant distinct technical advantages over known systems. For example, there is a one-to-many relationship between a Context and its MOs, which allows for much finer granularity in change control than offered previously. Changes to an individual occurrence (or in some cases a small group of occurrences sharing an MO) can be authorized and controlled independently. Further, propagation of data is greatly reduced since checking out an MO for update will only copy the data controlled by that MO, not the data on every other occurrence in the same context as happens today. Another benefit is the performance improvement resulting from manipulating and replicating data in much smaller packages. Another significant benefit is that contention issues are resolved. In the prior systems, authorized access to one occurrence locked all other occurrences from being modified. The insertion of Managed Occurrences as the control authority relieves this limitation and allows hundreds of engineers to work in parallel on different parts of a product in the product context without sacrificing data control and integrity standards.

Disclosed embodiments enable other significant capabilities not found in prior systems. These include browsing, querying, check-in and check-out, revisions, incremental change, release status, the ability to submit to a workflow, historical evolution, effectivity, and access management rules.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for product data management, the method performed by a data processing system and comprising:
   maintaining a data structure for a complex item, the data structure including a root node representing the complex item, at least one assembly node associated with the root node, and a plurality of part nodes each associated with the assembly node;
   defining at least two absolute occurrences associated with the root node and corresponding to at least the root node and the assembly node, wherein each absolute occurrence is a unique path through the structure;
   defining at least one managed occurrence that includes a plurality of the absolute occurrences; and
   using the managed occurrence as a central control authority for the plurality of absolute occurrences.

2. The method of claim 1, wherein a plurality of managed occurrences are defined, and the data processing system allows different managed occurrences and their respective absolute occurrences to be simultaneously manipulated by different users.

3. The method of claim 1, wherein at least one of the absolute occurrences also corresponds to a part node.

4. The method of claim 1, wherein the data processing system also displays a visual representation of a least a portion of the complex item to a user according to a selected one of the at least one managed occurrences.

5. The method of claim 1, wherein using the managed occurrence as a central control authority includes performing access control, workflow, checkout, and release functions using the managed occurrence.

6. The method of claim 1, wherein the complex item is a product, the assembly node represents an assembly of the product, and the part node represents an individual part of the assembly.

7. The method of claim 1, wherein the context node has control over the managed occurrence.

8. A data processing system comprising:
   a processor; and an accessible memory, the data processing system particularly configured to maintain a data structure for a complex item, the data structure including a root node representing the complex item, at least one assembly node associated with the root node, and a plurality of part nodes each associated with the assembly node;
   define at least two absolute occurrences associated with the root node and corresponding to at least the root node and the assembly node, wherein each absolute occurrence is a unique path through the structure;

define at least one managed occurrence that includes a plurality of the absolute occurrences; and use the managed occurrence as a central control authority for the plurality of absolute occurrences.

9. The data processing system of claim 8, wherein a plurality of managed occurrences are defined, and the data processing system allows different managed occurrences and their respective absolute occurrences to be simultaneously manipulated by different users.

10. The data processing system of claim 8, wherein at least one of the absolute occurrences also corresponds to a part node.

11. The data processing system of claim 8, wherein the data processing system is also configured to display a visual representation of a least a portion of the complex item to a user according to a selected one of the at least one managed occurrences.

12. The data processing system of claim 8, wherein using the managed occurrence as a central control authority includes performing access control, workflow, checkout, and release functions using the managed occurrence.

13. The data processing system of claim 8, wherein the complex item is a product, the assembly node represents an assembly of the product, and the part node represents an individual part of the assembly.

14. The data processing system of claim 8, wherein the context node has control over the managed occurrence.

15. A non-transitory computer-readable medium encoded with executable instructions that, when executed, cause one or more data processing systems to:

maintain a data structure for a complex item, the data structure including a root node representing the complex item, at least one assembly node associated with the root node, and a plurality of part nodes each associated with the assembly node;

define at least two absolute occurrences associated with the root node and corresponding to at least the root node and the assembly node, wherein each absolute occurrence is a unique path through the structure;

define at least one managed occurrence that includes a plurality of the absolute occurrences; and use the managed occurrence as a central control authority for the plurality of absolute occurrences.

16. The computer-readable medium of claim 15, wherein a plurality of managed occurrences are defined, and the instructions cause the data processing system to allow different managed occurrences and their respective absolute occurrences to be simultaneously manipulated by different users.

17. The computer-readable medium of claim 15, wherein at least one of the absolute occurrences also corresponds to a part node.

18. The computer-readable medium of claim 15, wherein the instructions cause the data processing system to display a visual representation of a least a portion of the complex item to a user according to a selected one of the at least one managed occurrences.

19. The computer-readable medium of claim 15, wherein using the managed occurrence as a central control authority includes performing access control, workflow, checkout, and release functions using the managed occurrence.

20. The computer-readable medium of claim 15, wherein the complex item is a product, the assembly node represents an assembly of the product, and the part node represents an individual part of the assembly.

\* \* \* \* \*